US008131944B2

(12) United States Patent
Fang et al.

(10) Patent No.: US 8,131,944 B2
(45) Date of Patent: Mar. 6, 2012

(54) USING CRITICALITY INFORMATION TO ROUTE CACHE COHERENCY COMMUNICATIONS

(75) Inventors: Zhen Fang, Beaverton, OR (US); Liqun Cheng, Hillsboro, OR (US); Sriram R. Vangal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 12/156,343

(22) Filed: May 30, 2008

(65) Prior Publication Data

US 2009/0300292 A1    Dec. 3, 2009

(51) Int. Cl.
G06F 12/00 (2006.01)
(52) U.S. Cl. ........................ 711/141; 711/144
(58) Field of Classification Search .......... 711/141
See application file for complete search history.

(56) References Cited

U.S. PATENT DOCUMENTS

| | | | |
|---|---|---|---|
| 6,035,424 A | 3/2000 | Freerksen et al. | |
| 6,628,615 B1 | 9/2003 | Joseph et al. | |
| 6,961,781 B1 * | 11/2005 | Mukherjee et al. | 709/240 |
| 2003/0105828 A1 * | 6/2003 | Sano et al. | 709/212 |
| 2005/0041655 A1 * | 2/2005 | Hughes | 370/389 |
| 2008/0247402 A1 * | 10/2008 | Sasaki et al. | 370/401 |
| 2009/0187716 A1 * | 7/2009 | Comparan et al. | 711/141 |

OTHER PUBLICATIONS

German Patent Office, Office Action for DE Application No. 10 2009 022 152.2-53 (with English Translation), dated Jun. 14, 2010, 8 pgs.
Chinese Patent Office, Office Action mailed Dec. 27, 2010 in Chinese patent application No. 200910142601.5.
Evgeny Bolotin, et al., "The Power of Priority: NoC based Distributed Cache Coherency," 2007, pp. 117-126.
Chinese Patent Office, Second Office Action mailed Jun. 22, 2011 in Chinese application No. 200910142601.5.

* cited by examiner

*Primary Examiner* — Tuan Thai
*Assistant Examiner* — Ngoc Dinh
(74) *Attorney, Agent, or Firm* — Trop, Pruner & Hu, P.C.

(57) ABSTRACT

In one embodiment, the present invention includes a method for receiving a cache coherency message in an interconnect router from a caching agent, mapping the message to a criticality level according to a predetermined mapping, and appending the criticality level to each flow control unit of the message, which can be transmitted from the interconnect router based at least in part on the criticality level. Other embodiments are described and claimed.

13 Claims, 4 Drawing Sheets

USING CRITICALITY INFORMATION TO ROUTE CACHE COHERENCY COMMUNICATIONS

BACKGROUND

In a multi-processor system having multiple processors and multiple caches, each cache may store a copy of a piece of data stored in memory. Problems arise when more than one cache contains a copy of the same piece of data. Various techniques have been developed to ensure data coherency across multiple caches. For example, when the data in one cache is modified, other copies of the data are marked as invalid so that they will not be used.

To help maintain cache coherency, many systems include a directory to aid in determining presence and state of data in cache lines of such multiple caches. The state of a cache line may indicate whether the line has only one valid copy outside of the main memory, has multiple valid copies shared by multiple caches, or has no copies outside of main memory (i.e., it has been invalidated in all caches).

Efficiency of cache coherency can improve overall performance of general-purpose processors. This is especially true for many-core processors and large-scale cache coherent non-uniform memory architecture (cc-NUMA) systems. Different systems can have many different cache coherence message types, each of which can have different timing criticality properties, due to hop imbalance root caused by directory indirection. However, existing systems do not differently handle these different message types.

DETAILED DESCRIPTION

In various embodiments, an interconnect router or other system component can be configured to be criticality-aware. That is, the router delay of critical coherence messages can be made shorter, at the cost of potentially slowing down non-critical messages. Criticality may be extracted by hardware at run time based on cache coherent message types. Such criticality is then used to drive management of an interconnect on which the messages travel, such as virtual channels of a point-to-point (PTP) or other interconnection scheme. Embodiments apply to both network-on-chips and traditional stand-alone routers. Embodiments may be implemented in microarchitecture hardware and can be completely transparent to software. Using such embodiments, cache coherency handling can be significantly increased.

Figure 1:
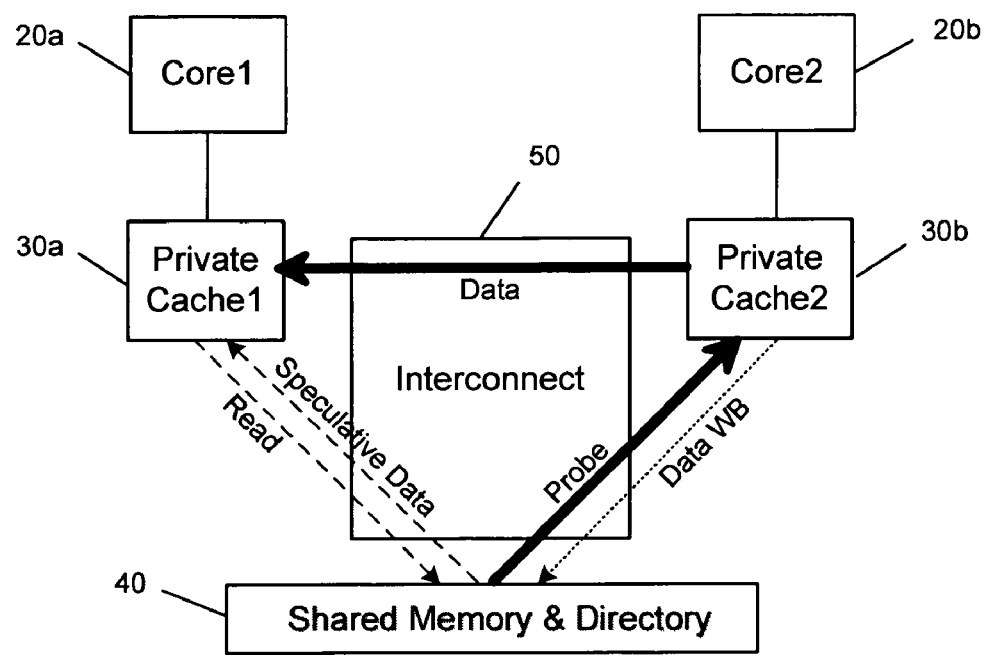
FIG. 1 is a block diagram of a portion of a system in accordance with one embodiment of the present invention.

Referring now to FIG. 1, shown is a block diagram of a portion of a system that incorporates a directory that implements a given cache coherency protocol. While the scope of the present invention is not limited in this regard, the cache coherency protocol may be in accordance with a modified exclusive shared invalid (MESI) or modified exclusive shared invalid forward (MESIF) protocol or another such protocol. In the embodiment shown in FIG. 1, multiple cores, only two of which $20_a$ and $20_b$ (generically core 20) are shown, are each coupled to a corresponding private cache $30_a$ and $30_b$ (generically private cache 30). In some embodiments, private caches 30 may be a lowest level cache, e.g., a level zero cache closely associated with its corresponding core.

In turn, caches 30 may be coupled to a shared memory 40. In various embodiments, shared memory 40 may be an inclusive shared cache memory or system main memory. In this way, shared memory 40 includes all the data present in caches 30, as well as potentially additional data. In other words, the data present in caches 30 may be inclusive with that in memory 40, but not vice-versa. Still further, shared memory 40 may include a directory. Such a directory may be a separate array or other portion of memory 40 that includes a plurality of entries (and associated control logic) to indicate a location of corresponding cache lines in the lower level caches, as well as the state of such cache lines. Accordingly, the directory of memory 40 can be used to implement a given cache coherency protocol.

In one implementation, system 10 may be a network on a chip (NoC). Such a NoC may be a single die integrated circuit that connects various processing agents such as cores, specialized processors, accelerators and so forth, as well as local memories and other such structures. All of these various agents may be coupled by a given interconnect fabric such as interconnect 50 shown in FIG. 1. In different implementations, particular agents may be interconnected by way of PTP links that couple devices together through intervening routers of an interconnect. Accordingly, while not shown for ease of illustration in FIG. 1, understand that interconnect 50 may represent interconnect links, as well as interconnect routers.

To maintain cache coherency for the respective memories in system 10, various cache coherency messages may be sent between different agents to request data present in a given memory, as well as to gain understanding of a state of such data. The delays of different cache coherence messages can have a very different performance impact on applications. FIG. 1 shows a scenario in a MESI protocol where cache memory $30a$ issues a read request (Message (Msg) 1) to a block that is in a dirty state in cache memory $30b$. According to a given coherency protocol, this read request may cause the transmission of additional messages, including a second message (Message 2), which sends the requested data present in shared memory 40 directly to cache memory $30_a$. However, note that this data is speculative, as it is unknown whether a modified copy of the data exists, e.g., in cache memory $30_b$. Accordingly, still responsive to the read request from cache memory $30_a$ the directory sends a probe message (i.e., Message 3) to cache memory $30_b$. Responsive to this message, cache memory $30_b$ may cause the data, which may be in a dirty state, to be sent (Msg 4) directly to cache memory $30_a$. Finally, a writeback (WB) message (i.e., Message 5) is sent to provide the dirty data from cache memory $30_b$ back to shared memory 40.

Messages 3 and 4 are serialized steps to accomplish this read request and they constitute the critical path. In other words, Messages 3 and 4 have a higher priority and should have a shorter delay, because the latency of the memory request of Message 1 is dependent on these messages. Thus these two messages may be mapped to a highest criticality level. In contrast, Message 2 is useless in this example (assuming that the requested data is in a modified state in cache memory $30_b$), but according to a conventional protocol it usually would arrive in memory $30_a$ before the valid data of Message 4. This undesirable scenario is a result of hop imbalance root caused by directory indirection. Message 5 is least critical, and thus can be mapped to a lowest criticality level. Message 1 is also on the critical path, but it ties up less system resource than Messages 3 and 4. Message 2 is usually not on the critical path, though its data would be useful if cache memory $30_b$ did not have a dirty copy. Messages 1 and 2 may be classified as a medium criticality level. The different criticality levels are thus identified in FIG. 1 via the solid line, and various dashed lines.

There are many variants of the MESI protocol, but for each of them there can be multiple levels of criticalities, with each level corresponding to a given set of message types. While the scope of the present invention is not limited in this regard, in some implementations, between approximately 2 and 8 criticality levels may be identified. Furthermore, each of these criticality levels may be matched to one or more coherency protocol message types. Referring now to Table 1, below shown are an example protocol messages and their corresponding criticality level.

TABLE 1

| Most Critical | Medium Critical | Non-critical |
|---|---|---|
| RspI | RspFwd | WbMtoI |
| RspS | RspFwdS | WbMtoE |
| RspCnflt | RspFwdIWb | WbMtoS |
| SnpCode | RdCur | RspIWb |
| SnpData | RdCode | RspSWb |
| SnpInvOwn | RdData | |
| SnpInvItoE | RdInvOwn | |
| AckCnflt | InvItoE | |

Table 1 thus shows various cache coherence messages, each of which is mapped to one of three criticality levels. The names of the various messages shown in Table 1 (RspI, RspFwd, etc.) are mnemonics, and may have different labels in different implementations. Generally these names include a message type abbreviation (e.g., response (Rsp), snoop (Snp), acknowledge (Ack), read (Rd), writeback (WB), forward (Fwd), etc.), and a cache state abbreviation (e.g., one of the MESI states).

In general, the messages of the highest criticality level shown in Table 1 are directed to probe messages and responses thereto. The medium criticality level is generally associated with requests and certain responses, while the lowest criticality level is generally associated with writeback messages. Understand that this above Table is an example mapping, and other messages and different protocols may have different mappings.

As will be described further below, in various implementations, criticality or other such control logic may be used to map protocol cache coherency message types to a given criticality level. In various embodiments, an interconnect router or other switching logic can be made criticality-aware. In this way, the router delay of critical coherence messages can become shorter, at the cost of potentially slowing down non-critical messages. Criticality can be extracted by hardware at run time based on message types, and can be then used to drive VC management.

Figure 2:
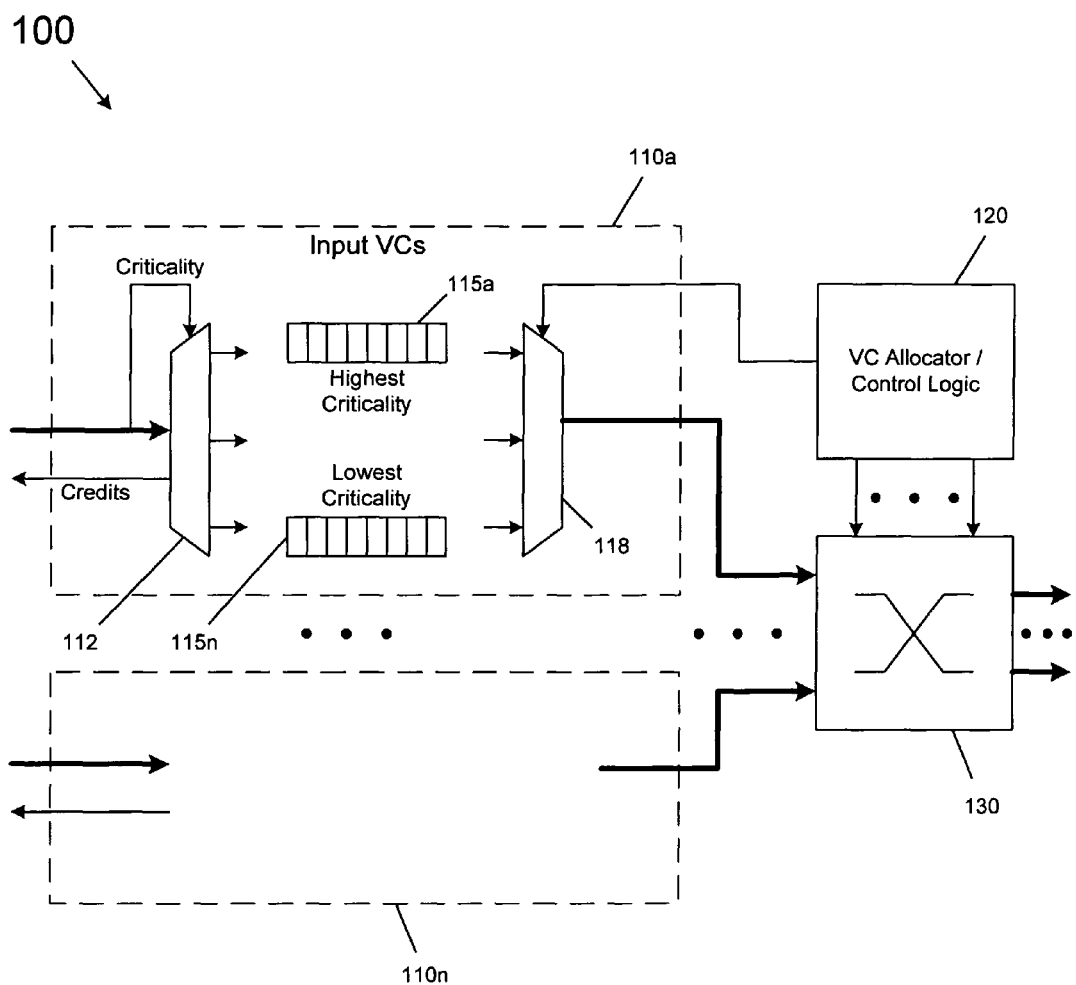
FIG. 2 is a block diagram of an interconnect router in accordance with one embodiment of the present invention.

Referring now to FIG. 2, shown is a block diagram of an interconnect router in accordance with one embodiment of the present invention. As shown in FIG. 2, interconnect router 100 may be a router structure of an interconnect system. As will be discussed further below, many such interconnect routers may be present in a given system to receive transactions from an input-connected router and forward such transactions to an output-connected router. As shown in FIG. 2, an exemplary router 100 includes a plurality of input virtual channels (VCs) $110_a$-$110_n$ (generically VC 110). Each VC 110 is coupled to receive incoming messages. Such messages may take various forms including request messages, data messages, acknowledgment messages and so forth. These incoming messages can be received from an input-connected router that is similarly configured. However, in other implementations at least some of the inputs to a given router may be received directly from a caching agent such as a processor core or other such agent.

Incoming messages are provided to an input multiplexer 112, which is controlled based on criticality information associated with the messages. That is, in various embodiments the messages may be link layer messages, in which a transaction is segmented into a plurality of flow control units such as packets, e.g., flits, where each flit corresponds to the smallest link level message and which includes a header. This header may include criticality information. For example, a transaction layer may provide the criticality information to a link layer, which in turn appends the criticality information to each link layer packet (e.g., flit) that it generates. Based on a level of criticality associated with a given message, e.g., a cache coherency message, the associated flit may be provided to one of a plurality of queues $115_a$-$115_n$ (generically queue 115), each of which may be associated with a given criticality level. In one embodiment, queues 115 may be first-in-first-out (FIFO) buffers, although the scope of the present invention is not limited in this regard. In one embodiment, each queue 115 may be associated with a single criticality level, although in other embodiments, a queue may provide storage for messages of multiple criticality levels. To output messages from VCs 110, a VC allocator/control logic 120 may be coupled to an output multiplexer 118 to control message output. In various implementations, the control of messages to be sent from VC 110 may be according to criticality level. As shown in FIG. 2, the outputs from the various VCs 110 are provided to a switch 130, which is also controlled by VC allocator 120 to output the messages to an output-connected router or other such agent.

Note that in the instance of an originating or source router for a message, i.e., a router that is connected to a caching agent that generates a cache coherency message, VC allocator/control logic 120 may map the message type to a given criticality level and apply that criticality level to each flit of the message that is sent from switch 130. In this way, an output-connected router that receives the message may also receive the associated criticality level to thus manage its passing through the virtual channels accordingly. While shown with this particular implementation in the embodiment of FIG. 2, the scope of the present invention is not limited in this regard.

In different embodiments, mapping from a cache coherence message type to a criticality level is determined by the specific coherence protocol and performance target. At run time, a source router (which is connected to a caching agent) extracts the message type, translates it to one of the criticality levels, and appends this information into the flit header. In every intermediate router, VC allocation is simplified because the criticality bits in the flit header serve as the VC identifier.

After a flit is inserted to an appropriate queue 115, different manners of ensuring a fast delivery of the critical messages can be implemented. In one implementation, FIFOs can be prioritized such that a higher criticality FIFO always wins over a lower criticality FIFO in the competition for switch 130. In other embodiments, each queue 115 may have a different relative priority. This is accomplished using a priority-based hardware arbiter (e.g., within VC allocator 120) that provides a grant and enables "faster-path" for higher criticality messages. However, other implementations are possible.

Note that embodiments are orthogonal to existing VC designs, as each criticality level can have multiple VCs associated with it.

Since message types are exposed to the link layer, $\log_2 C$ bits may be used per flit, where C is the total number of criticality levels. In practice, C may be a small number like 4. Further, compared with a conventional homogeneous VC design, the size of a VC allocation arbiter can be reduced by a factor of V, where V is the number of virtual channels per port. Also, as embodiments are purely microarchitectural, there is no need for any software hints from a user (e.g., a programmer), and thus there is no effect on correctness of the cache coherence protocol. That is, rather than a software programmer encoding priority information for a message, a hardware-based priority scheme is provided.

Figure 3:
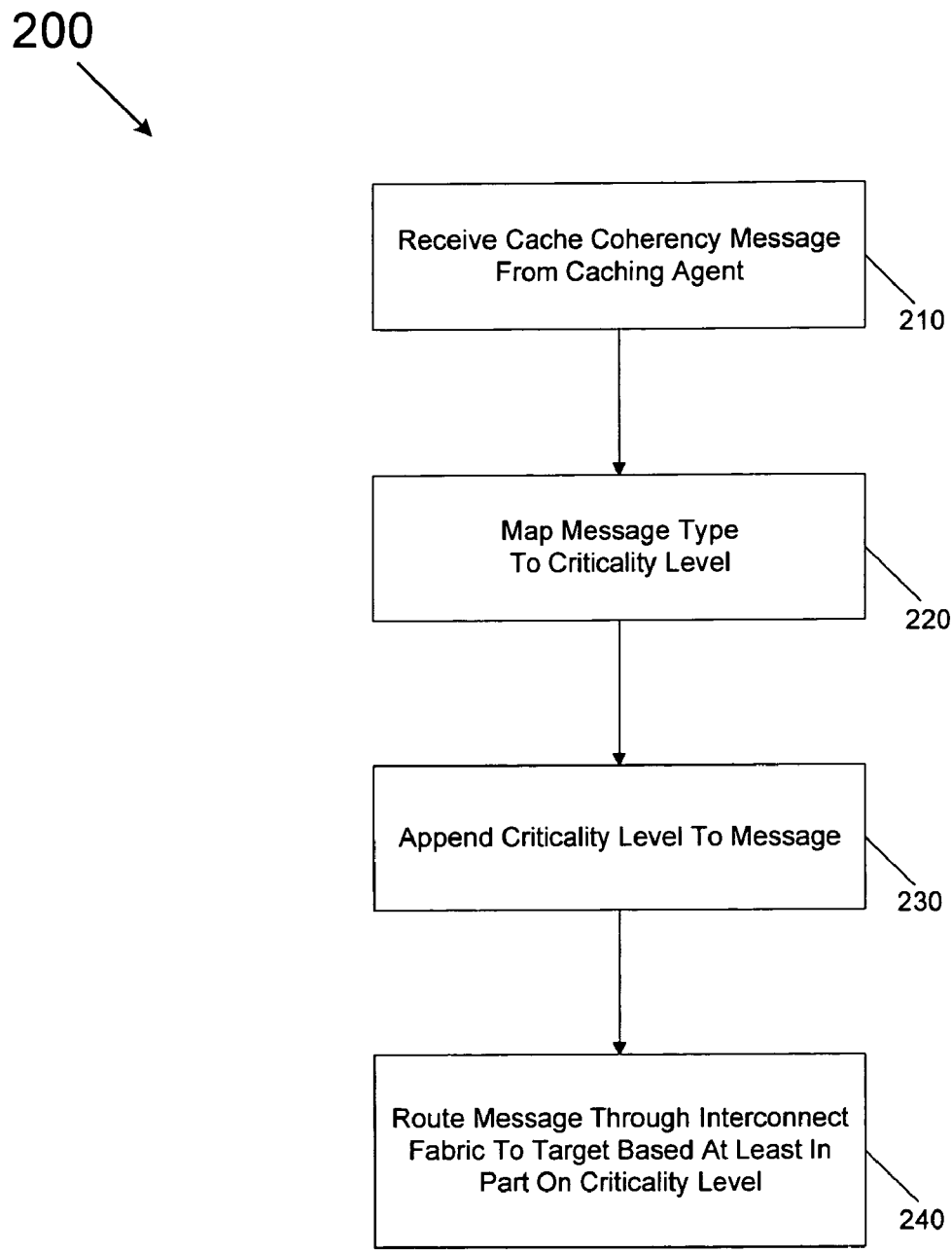
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 may be used to apply a criticality level to cache coherency message types and to enable use of the same in forwarding the message to its target. As shown in FIG. 3, method 200, which may be implemented in an interconnect fabric, e.g., within criticality or other control logic associated with a source router, as well as in various intermediary routers coupled between this source router and a target router that is coupled to the message target.

Method 200 may begin by receiving a cache coherency message from a caching agent (block 210). For example, a source router may receive a cache coherency message from a processor core or other agent. Next, this message type may be mapped to a criticality level (block 220). For example, criticality logic or other control logic of the source router may include or be associated with a table such as may be stored in a non-volatile memory that includes a mapping between the various message types of the cache coherency protocol and different criticality levels. In one embodiment, each message type may have its own criticality level, while in other embodiments a number of messages may be associated with a given criticality level.

Then, the router may append the criticality level to a message (block 230). For example, in a communication protocol in which a link layer provides flits to a physical layer, each such flit may have a criticality level inserted into its header. Based at least in part on this information, the message may be routed through an interconnect fabric to its target (block 240). In this way, messages of a higher priority may be handled more efficiently, improving memory latency times and system performance. While shown with this particular implementation in the embodiment of FIG. 3, the scope of the present invention is not so limited in this regard.

Figure 4:
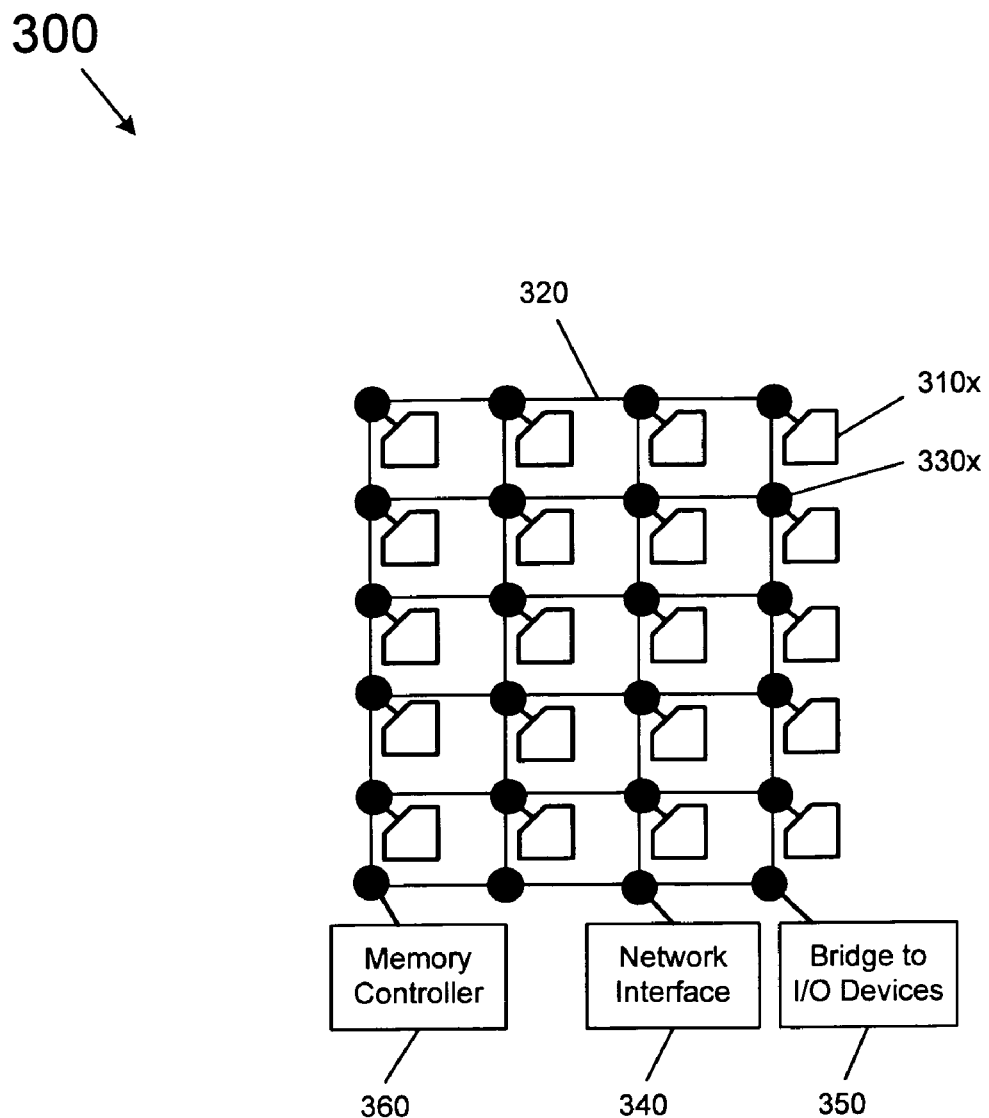
FIG. 4 is a block diagram of a system in accordance with one embodiment of the present invention.

Referring now to FIG. 4, shown is a block diagram of a system in accordance with one embodiment of the present invention. As shown in FIG. 4, system 300 may be a network on a chip or a multiple-chip device. However, the scope of the present invention is not limited in this regard. In the embodiment of FIG. 4, system 300 includes a plurality of caching agents $310_x$, each of which is coupled to an interconnection fabric 320 by one or more routers $330_x$. Caching agents $310_x$ may be processor cores, cache memories or other processing agents. As further shown in FIG. 4, a network interface 340 and a bridge 350 may be coupled to respective routers 330. In one embodiment, devices such as an input/output (I/O) controller hub or a switch in accordance with a Peripheral Component Interconnect (PCI) Express™ (PCIe) protocol may be coupled to bridge 350. As also shown in FIG. 4, a memory controller 360 may be coupled to another router 330 to handle memory operations to an off-chip memory, e.g., a dynamic random access memory (DRAM) or other system memory device. As one example of communication routing, if a flit is to travel from a top right agent $310x$ to memory controller 360, the flit may pass through nine routers, and each of the seven intermediary routers may pass the message using criticality information in accordance with an embodiment of the present invention. While shown with this particular implementation in the embodiment of FIG. 4, the scope of the present invention is not limited in this regard.

By utilizing message criticality information to manage virtual channels, embodiments can help the memory system to achieve higher performance than current routers. Further, embodiments may be implemented in microarchitecture such that performance benefits come at no software cost.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a plurality of virtual channels each including:
an input multiplexer to receive cache coherency messages, the cache coherency messages each having a criticality indicator associated therewith;
a plurality of queues coupled to the input multiplexer to store the cache coherency messages, wherein each of the queues is associated with at least one of the criticality indicators; and
an output multiplexer coupled to the plurality of queues to select an output of one of the queues based at least in part on the corresponding criticality indicator;
a switch coupled to the plurality of virtual channels to output the cache coherency messages to an interconnect fabric; and
a criticality logic to map a cache coherency message to a criticality indicator based on a type of the cache coherency message and to append the criticality indicator to a header of each packet of the cache coherency message, wherein the criticality logic is associated with a table to map each of a set of cache coherency messages to a criticality indicator, and to perform the mapping without a software hint from a user.

2. The apparatus of claim 1, wherein the criticality indicator is to indicate a relative criticality of a cache coherency message with respect to a set of cache coherency messages.

3. The apparatus of claim 1, further comprising a virtual channel allocator to control the output multiplexer, wherein the virtual channel allocator includes an arbiter to control the output multiplexer based at least in part on a relative priority of the plurality of queues.

4. The apparatus of claim 3, wherein the virtual channel allocator is to select an output of a first queue having a first criticality indicator ahead of an output of a second queue having a second criticality indicator, wherein the first criticality indicator is of a higher level than the second criticality indicator.

5. The apparatus of claim 4, wherein the output of the first queue is for a probe message and the output of the second queue is for a data response from a directory transmitted before receipt of a response to the probe message.

6. The apparatus of claim 1, wherein the apparatus comprises a network on a chip (NoC) including a plurality of caching agents coupled by the interconnect fabric and a plurality of routers each including the plurality of virtual channels and the switch.

7. The apparatus of claim 6, wherein a first router is to append the criticality indicator to an incoming cache coherency message from a first caching agent and a second router is to route the incoming cache coherency message according to a priority based at least in part on the criticality indicator.

8. A method comprising:
receiving a cache coherency message in an input multiplexer of a virtual channel of an interconnect router from a caching agent and storing the cache coherency message in one of a plurality of queues coupled to the input multiplexer;
mapping a message type of the cache coherency message to a criticality level according to a table associated with the interconnect router without a software hint from a user; and
appending the criticality level to each flow control unit of the cache coherency message transmitted from the interconnect router and selecting an output of one of the queues via an output multiplexer coupled to the plurality of queues.

9. The method of claim 8, further comprising routing the cache coherency message through an interconnect fabric from the interconnect router to a target coupled to a second interconnect router.

10. The method of claim 9, further comprising receiving the cache coherency message at the input multiplexer of the virtual channel of an intermediary interconnect router and storing the cache coherency message in one of the plurality of queues based at least in part on the criticality level.

11. The method of claim 10, further comprising routing the cache coherency message from the output multiplexer of the virtual channel based at least in part on the criticality level.

12. The method of claim 11, further comprising routing the cache coherency message from the intermediary interconnect router ahead of a second cache coherency message, wherein the second cache coherency message has a lower criticality level than the criticality level of the cache coherency message.

13. A system comprising:
a plurality of caching agents each coupled to an interconnect fabric by a router;
each router including a plurality of virtual channels each including an input multiplexer to receive cache coherency messages, the cache coherency messages each having a criticality indicator based on a type of the cache coherency message, a plurality of queues coupled to the input multiplexer to store the cache coherency messages, wherein each of the queues is associated with at least one of the criticality indicators, and an output multiplexer coupled to the plurality of queues to select an output of one of the queues based at least in part on the corresponding criticality indicator, a criticality logic to map a cache coherency message to a criticality indicator without a software hint from a user and to append the criticality indicator to a header of each packet of the cache coherency message, and a switch coupled to the plurality of virtual channels to output the cache coherency messages to the interconnect fabric;
a network interface coupled to at least one router; and
a memory controller coupled to at least one other router.

* * * * *